United States Patent
Horng et al.

(10) Patent No.: US 10,763,720 B2
(45) Date of Patent: Sep. 1, 2020

(54) BEARING ASSEMBLY AND MOTOR INCLUDING THE SAME

(71) Applicant: Sunonwealth Electric Machine Industry Co., Ltd., Kaohsiung (TW)

(72) Inventors: Alex Horng, Kaohsiung (TW); Bo-Wei Chiou, Kaohsiung (TW); Kun-Ta Yang, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 60 days.

(21) Appl. No.: 16/112,947

(22) Filed: Aug. 27, 2018

(65) Prior Publication Data

US 2019/0115799 A1 Apr. 18, 2019

(30) Foreign Application Priority Data

Oct. 13, 2017 (TW) .............................. 106135117 A

(51) Int. Cl.
*H02K 5/24* (2006.01)
*H02K 5/173* (2006.01)
(Continued)

(52) U.S. Cl.
CPC ........... *H02K 5/1732* (2013.01); *F16C 19/06* (2013.01); *F16C 19/52* (2013.01); *F16C 19/527* (2013.01); *F16C 25/06* (2013.01); *F16C 25/08* (2013.01); *F16C 25/083* (2013.01); *F16C 27/04* (2013.01); *F16C 27/06* (2013.01); *F16C 27/066* (2013.01); *F16C 29/12* (2013.01); *F16C 29/123* (2013.01);
(Continued)

(58) Field of Classification Search
CPC .... H02K 5/1732; H02K 7/003; H02K 5/1735; H02K 7/08; H02K 5/173; H02K 7/083; H02K 5/24; H02K 2205/03; H02K 2213/03; F16C 25/06; F16C 35/067; F16C 35/077; F16C 27/06; F16C 29/123; F16C 27/04; F16C 25/083; F16C 25/08; F16C 19/52; F16C 35/04; F16C 35/042; F16C 29/12; F16C 19/06; F16C 19/527; F16C 27/066; F16C 2380/26; F16C 33/30; F16C 19/02
USPC ..................................................... 310/51, 90
See application file for complete search history.

(56) References Cited

U.S. PATENT DOCUMENTS 4,386,812 A * 6/1983 Anderson ............. F16C 35/067
384/542
6,485,023 B2 * 11/2002 Budrow ................ F04D 29/124
277/370
(Continued)

FOREIGN PATENT DOCUMENTS

| CN | 101516641 B | 3/2011 |
|---|---|---|
| JP | S4955602 U | 5/1974 |
| TW | I602385 | 10/2017 |

*Primary Examiner* — John K Kim
(74) *Attorney, Agent, or Firm* — Alan D. Kamrath; Karin K. Williams; Mayer & Williams PC

(57) ABSTRACT

A bearing assembly including a bearing seat, at least one bearing and a shaft is disclosed. The bearing seat includes a chamber, an assembly hole and a shaft hole. The assembly hole and the shaft hole intercommunicate with the chamber. The bearing seat has a slit which is adjustable. The at least one bearing is received in the chamber. The shaft extends through the shaft hole and the at least one bearing and includes at least one abutment portion. The at least one bearing abuts the at least one abutment portion. In addition, a motor including a bearing assembly is disclosed.

20 Claims, 15 Drawing Sheets

(51) Int. Cl.
*H02K 7/08* (2006.01)
*F16C 25/06* (2006.01)
*F16C 27/06* (2006.01)
*F16C 19/52* (2006.01)
*F16C 19/06* (2006.01)
*F16C 29/12* (2006.01)
*F16C 35/04* (2006.01)
*F16C 25/08* (2006.01)
*F16C 27/04* (2006.01)
*F16C 35/077* (2006.01)
*F16C 35/067* (2006.01)
*H02K 7/00* (2006.01)

(52) U.S. Cl.
CPC ............ *F16C 35/04* (2013.01); *F16C 35/042* (2013.01); *F16C 35/067* (2013.01); *F16C 35/077* (2013.01); *H02K 5/173* (2013.01); *H02K 5/1735* (2013.01); *H02K 5/24* (2013.01); *H02K 7/003* (2013.01); *H02K 7/08* (2013.01); *H02K 7/083* (2013.01); *F16C 2380/26* (2013.01); *H02K 2205/03* (2013.01); *H02K 2213/03* (2013.01)

(56) References Cited

U.S. PATENT DOCUMENTS

| | | | | |
|---|---|---|---|---|
| 8,231,279 B2* | 7/2012 | Falsetti | ................ | F16C 35/077 384/498 |
| 2002/0101038 A1* | 8/2002 | Budrow | ................ | F04D 29/124 277/370 |
| 2003/0099417 A1* | 5/2003 | Bauer | ................ | F16C 35/077 384/535 |
| 2006/0056995 A1* | 3/2006 | Dinkel | ................ | F04B 17/03 417/410.1 |
| 2010/0025952 A1* | 2/2010 | Falsetti | ................ | F16C 35/042 280/124.1 |
| 2013/0334920 A1* | 12/2013 | Kim | ................ | H02K 5/1732 310/88 |
| 2017/0332749 A1* | 11/2017 | Pan | ................ | E04H 15/28 |
| 2018/0062473 A1* | 3/2018 | Horng | ................ | H02K 3/345 |
| 2018/0226872 A1* | 8/2018 | Barthel | ................ | H02K 5/15 |
| 2019/0115799 A1* | 4/2019 | Horng | ................ | F16C 25/06 |

* cited by examiner

BEARING ASSEMBLY AND MOTOR INCLUDING THE SAME

CROSS REFERENCE TO RELATED APPLICATION

The application claims the benefit of Taiwan application serial No. 106135117, filed on Oct. 13, 2017, and the entire contents of which are incorporated herein by reference.

BACKGROUND OF THE INVENTION

1. Field of the Invention

The present invention generally relates to a ball bearing and, more particularly, to a bearing assembly capable of adjusting the gaps between the balls and the inner and outer races thereof.

The present invention generally relates to a motor and, more particularly, to a motor including a bearing assembly.

2. Description of the Related Art

To increase the rotating speed of the rotor, the shaft of the conventional motor is coupled with at least one bearing which may be a self-lubricating bearing or a ball bearing. The at least one bearing is disposed into a bearing seat. As an example of the ball bearing, there are two ball bearings (each including inner and outer races) used. The two ball bearings are spaced from each other in the bearing seat. The inner race is press fit around the shaft, and the outer race is press fit with the bearing seat. Alternatively, an adhesive is applied between the outer race and the bearing seat to fix the outer race to the bearing seat.

No matter the outer race is coupled with the bearing seat by press fitting or via the use of the adhesive, the ball bearings can rotate smoothly and do not produce noise in the early time. However, after a certain period of time, the gaps between the balls and the inner and outer races will become larger due to the friction. Thus, noise is generated during the operation of the motor. In a worse case, the ball bearings are even broken and cannot operate anymore.

In light of this, it is necessary to improve the bearing structure of the conventional motor.

SUMMARY OF THE INVENTION

It is therefore the objective of this invention to provide a bearing assembly which has a slit that is adjustable. Specifically, a gap between the outer race of the ball bearing and the bearing seat can be adjusted to permit the outer race of the ball bearing to be securely fixed in the bearing seat.

It is another objective of this invention to provide a bearing assembly which has a slit that is adjustable. The balls of the ball bearing can be securely coupled with the inner and outer races of the ball bearing to prevent the noise during the operation of the motor and to prolong the service life of the motor.

In an aspect, a bearing assembly including a bearing seat, at least one bearing and a shaft is disclosed. The bearing seat includes a chamber, a shaft-coupling hole and a shaft hole. The shaft-coupling hole and the shaft hole intercommunicate with the chamber. The bearing seat has a slit which is adjustable. The at least one bearing is received in the chamber. The shaft extends through the shaft hole and the at least one bearing and includes at least one abutment portion. The at least one bearing abuts the at least one abutment portion.

In another aspect, a motor including a bearing assembly is disclosed.

In a further aspect, a motor including a bearing assembly is disclosed. The motor includes a housing, a stator received in the housing, a bearing seat mounted to the housing and having a slit which is adjustable, a bearing received in the bearing seat and including an inner race and an outer race, a shaft extending through the bearing, and a rotor coupled with the shaft and rotating relatively to the stator.

Based on the above, via the arrangement of the slit, the bearing assembly according to the invention can misalign the inner race with the outer race by applying pressure to the inner race or the outer race when gaps are formed between the balls and the inner race and the outer race due to the friction therebetween. In this regard, a positioning member can be tightened up to adjust the slit in a size as required, such that the balls can be securely coupled with the inner race and the outer race. Therefore, the motor including the bearing assembly can achieve the advantages of reducing the noise in rotation and increasing the lifespan of the bearings.

In an example, the bearing assembly further includes a cover coupled with the bearing seat. Thus, the cover is able to abut the bearing.

In the example, the at least one bearing includes an upper bearing relatively distant to the cover and a lower bearing relatively adjacent to the cover. Each of the upper and lower bearings includes an inner race and an outer race. An elastic member is disposed between the cover and the outer race of the lower bearing.

In the example, the outer race includes an outer wall fitted with a rubber ring. Thus, a vibration reduction effect can be provided.

In the example, the cover includes a central hole, and an annular lip is provided at an edge of the central hole and protrudes from a face of the cover facing the bearing seat. Thus, the elastic member can be positioned.

In the example, the inner race has an outer diameter and the outer race has an outer diameter, and the annular lip includes a diameter larger than the outer diameter of the inner race and smaller than the outer diameter of the outer race. Thus, the elastic member can be aligned with the outer race.

In the example, the bearing seat includes a plurality of engaging holes on one end face of the bearing seat where the shaft-coupling hole is. The cover has a plurality of through-holes. A plurality of fasteners respectively extends through the plurality of through-holes and is threadedly engaged with the plurality of engaging holes of the bearing seat, respectively. Thus, the assembly is convenient.

In the example, the bearing seat has a horizontal through-hole extending through the slit, and a positioning member extends through the horizontal through-hole to adjust the slit. Thus, the adjustment of the slit is convenient.

In the example, the slit is formed on an end of the bearing seat where the shaft-coupling hole is, and the slit is radially aligned with one of the at least one bearing. Thus, the fastening effect is improved.

In the example, the slit is radially aligned with one of the upper and lower bearings. Thus, the fastening effect is improved.

In the example, the slit extends through the bearing seat from an inner periphery to an outer periphery of the bearing seat and intercommunicates with the chamber. Thus, the adjustment of the slit is convenient.

In the example, the positioning member includes a screw and a nut. Thus, the assembly is convenient.

In the example, the horizontal through-hole is provided with inner threads, and the positioning member is provided with outer threads and is threaded through the inner threads of the horizontal through-hole. Thus, the assembly is convenient.

In the example, the elastic member is a rubber ring, a spring or a spring washer. Thus, pressure can be applied to the bearing.

In the example, the elastic member surrounds the annular lip and abuts the outer race. Thus, the outer race can be misaligned with the inner race under the arrangement of the slit.

In the example, the shaft includes an expansion portion. The expansion portion has an end forming an upper abutment portion and another end forming a lower abutment portion. The inner race of the upper bearing abuts the upper abutment portion, and the outer race of the upper bearing abuts an inner periphery of the bearing seat delimiting the chamber. The inner race of the lower bearing abuts the lower abutment portion, and the outer race of the upper bearing abuts the elastic member. Thus, the upper and lower bearings can be positioned with respect to the shaft.

In the example, the bearing seat further includes a protrusion protruding from a top of the bearing seat where the shaft hole is. The protrusion includes a slit extending through the protrusion and intercommunicating with the shaft hole. The protrusion includes a horizontal through-hole extending through the protrusion. A positioning member extends through the horizontal through-hole of the protrusion to adjust the slit. Thus, the adjustment of the slit is convenient.

In the example, the positioning member is a screw and a nut. Thus, the assembly is convenient.

In the example, the horizontal through-hole of the protrusion is provided with inner threads, and the positioning member is provided with outer threads and is threaded through the inner threads of the horizontal through-hole. Thus, the assembly is convenient.

In the example, the slit of the protrusion intercommunicates with the slit of the bearing seat. Thus, the adjustment of the slits is convenient.

In the example, the slit is formed on an end of the bearing seat where the shaft hole is and intercommunicates with the shaft hole. Thus, the adjustment of the slits is convenient.

In the example, the bearing seat includes a disc at an end of the bearing seat where the shaft-coupling hole is. The slit extends through the disc and towards another end of the bearing seat where the shaft hole is. The disc includes a cutoff portion intercommunicating with the horizontal through-hole. Thus, the adjustment of the slits is convenient.

In the example, a bottom plate is coupled with a bottom of the housing and includes a seat coupled with an end of the shaft. Thus, the rotating shaft can be supported.

In the example, a support is disposed between the shaft and the seat and is a self-lubricating bearing, an oil bearing or a ball bearing. Thus, the rotating shaft can be positioned more stably.

In the example, the inner race has an outer diameter and the outer race has an outer diameter. The bearing seat has a shaft hole. The shaft hole has a diameter larger than the outer diameter of the inner race and smaller than the outer diameter of the outer race. Thus, the top of the bearing seat is able to abut the outer race.

In the example, a positioning ring is disposed between the rotor and the shaft and has an end connected to the inner race of the bearing. Thus, the rotor is able to couple with the shaft.

In the example, the shaft is coupled with an elastic element. The elastic element has an end connected to an end of the positioning ring, as well as another end connected to an end of the support. Thus, pressure can be applied to the bearing.

In the example, the bearing seat includes a horizontal through-hole extending through the slit, and a positioning member extends through the horizontal through-hole to adjust the slit. Thus, the adjustment of the slit is convenient.

In the example, the positioning member includes a screw and a nut. Thus, the assembly is convenient.

In the example, the horizontal through-hole is provided with inner threads, and the positioning member is provided with outer threads and is threaded through the inner threads of the horizontal through-hole. Thus, the assembly is convenient.

In the example, the motor further includes a positioning ring fit around the bearing seat via a hole thereof. The positioning ring includes a slit extending through the positioning ring from an inner periphery delimiting the hole to an outer periphery of the positioning ring. A horizontal through-hole extends through the slit. A positioning member extends through the horizontal through-hole to adjust the slit. Thus, the bearing can be clamped by the bearing seat more securely.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
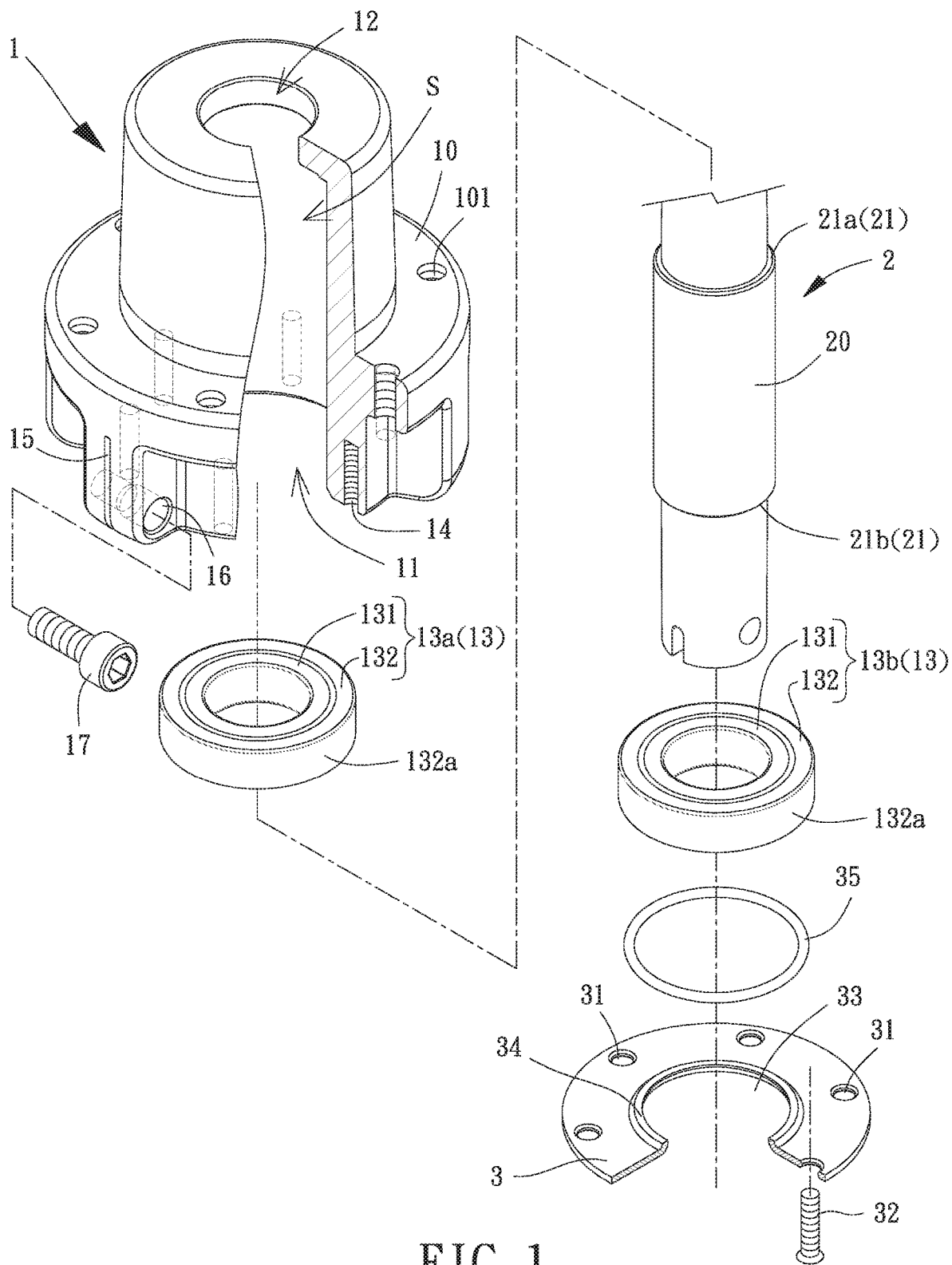
FIG. 1 is a perspective, exploded view of a bearing assembly for a motor according to a first embodiment of the invention.

In the various figures of the drawings, the same numerals designate the same or similar parts. Furthermore, when the terms "first", "second", "inner", "outer", "top", "bottom", "axial", "radial" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

FIG. 1 shows a bearing assembly for a motor according to a first embodiment of the invention. The bearing assembly includes a bearing seat 1 and a shaft 2 extending through the bearing seat 1.

Figure 2:
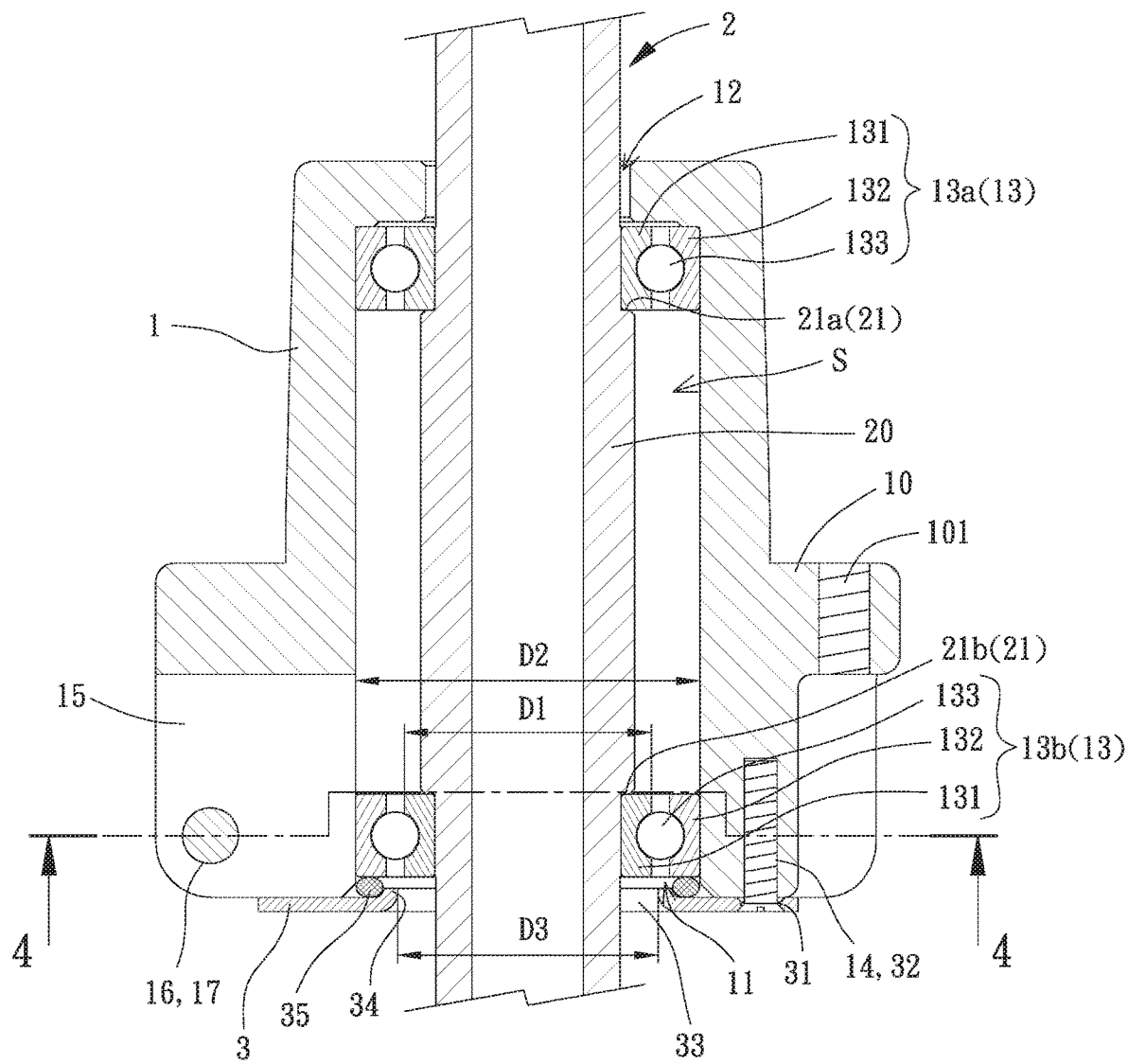
FIG. 2 is a cross sectional, assembled view of the bearing assembly for the motor according to the first embodiment of the invention.

Referring to FIGS. 1 and 2, the bearing seat 1 includes a chamber S, a shaft-coupling hole 11 and a shaft hole 12 which are intercommunicating with each other. The shaft-coupling hole 11 and the shaft hole 12 are located at two ends of the bearing seat 1, respectively. Thus, at least one bearing 13 can be disposed into the chamber S via the shaft-coupling hole 11. In this embodiment, there are two bearings 13 disposed in the chamber S, including an upper bearing 13a and a lower bearing 13b. Each of the upper bearing 13a and the lower bearing 13b includes an inner race 131, an outer race 132 and a plurality of balls 133. The plurality of balls 133 is disposed between the inner race 131 and the outer race 132 to permit the inner race 131 and the outer race 132 to rotate relatively to each other. The inner race 131 has an outer diameter D1 and the outer race 132 has an outer diameter D2.

Figure 3:
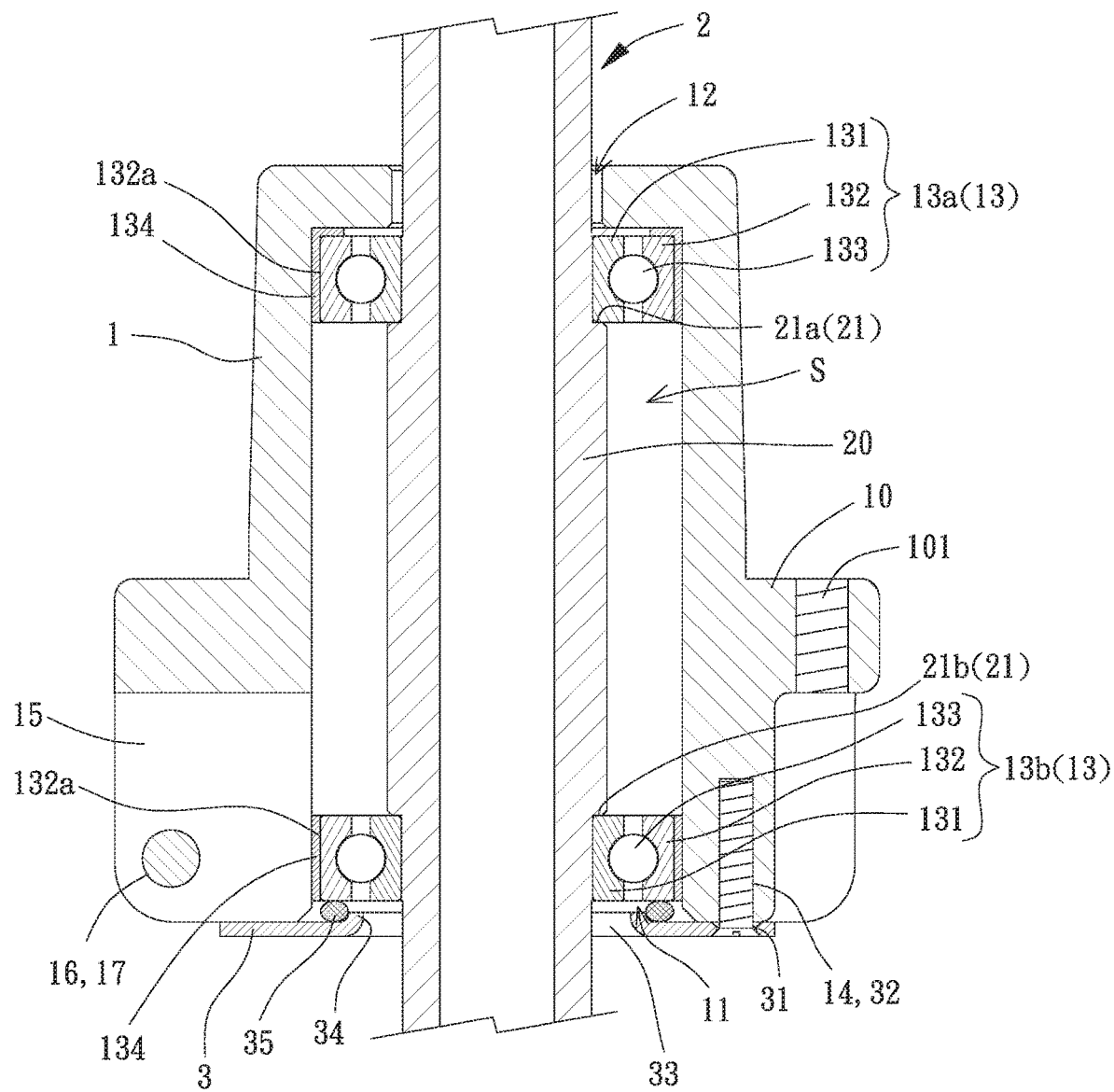
FIG. 3 shows the bearing assembly of FIG. 2 which further includes a rubber ring coupled with each outer race of a bearing of the bearing assembly.

Referring to FIG. 3, the outer race 132 further includes an outer wall 132a fitted with a rubber ring 134. When the bearing 13 is disposed in the chamber S, the rubber ring 134 is located between the outer race 132 and an inner wall of the bearing seat 1 to provide a vibration reduction effect. The rubber ring 134 is made of a flexible material such as rubber or silicon. The rubber ring 134 is in an "L" shape and is fit around the outer wall 132a of the outer race 132, as is shown with the upper bearing 13a in FIG. 3. Alternatively, the rubber ring 134 is in the form of a sleeve fit around the outer wall 132a of the outer race 132, as is shown with the lower bearing 13b in FIG. 3.

Referring to FIGS. 1 and 2, the bearing seat 1 further includes a plurality of engaging holes 14 on one end face of the bearing seat 1 where the shaft-coupling hole 11 is. Each of the plurality of engaging holes 14 can be engaged with a fastener 32. The bearing seat 1 further includes a slit 15 which is adjustable and preferably radially aligned with the bearing 13. The slit 15 extends through the bearing seat 1 and intercommunicates with the chamber S and the shaft-coupling hole 11. The bearing seat 1 has a horizontal through-hole 16 extending through the slit 15 and radially aligned with the bearing 13. A positioning member 17 can extend through the horizontal through-hole 16 to adjust the slit 15 in a size as required. The positioning member 17 includes a screw and a nut. Alternatively, the horizontal through-hole 16 is provided with inner threads. In this regard, the positioning member 17 is provided with outer threads and threaded through the inner threads of the horizontal through-hole 16, thereby adjusting the size of the slit 15. Accordingly, the bearing seat 1 can firmly clamp the bearing 13.

Referring to FIGS. 1 and 2, the shaft 2 extends through the chamber S of the bearing seat 1. Two ends of the shaft 2 extend out of the shaft-coupling hole 11 and the shaft hole 12 of the bearing seat 1, respectively. To couple the shaft 2 with the bearing seat 1 without relative rotation, the shaft 2 includes at least one abutment portion 21. The inner race 131 of the bearing 13 abuts the abutment portion 21. In this embodiment, the shaft 2 includes an expansion portion 20. The expansion portion 20 has an end forming an upper abutment portion 21a and another end forming a lower abutment portion 21b. Furthermore, the abutment portion 21 can be formed in an integral or mold-injecting manner or is press fit with a sleeve to form a diameter difference between the sleeve and the shaft 2.

Referring to FIGS. 1 and 2, the bearing assembly for the motor according to the first embodiment of the invention further may include a cover 3 having a plurality of through-holes 31 and a plurality of fasteners 32. Each of the plurality of through-holes 31 is aligned with a respective engaging hole 14. Each of the plurality of fasteners 32 can extend through a respective through-hole 31 and a respective engaging hole 14. The fastener 32 preferably couples with the engaging hole 14 by threaded engagement to fix the cover 3 to the end of the bearing seat 1 where the shaft-coupling hole 11 is. The cover 3 further includes a central hole 33. An annular lip 34 is provided at an edge of the central hole 33 and protrudes from the face of the cover 3 facing the bearing seat 1. The annular lip 34 includes a diameter D3 larger than the outer diameter D1 of the inner race 131 and smaller than the outer diameter D2 of the outer race 132.

Referring to FIGS. 1 and 2, an elastic member 35 may be disposed between the annular lip 34 and the outer race 132. The elastic member 35 is preferably disposed on the outer periphery of the annular lip 34 and abuts the outer race 132. Therefore, the elastic member 35 can apply pressure to the outer race 132. The elastic member 35 can be a conventional rubber ring, a spring or a spring washer.

Figure 4:
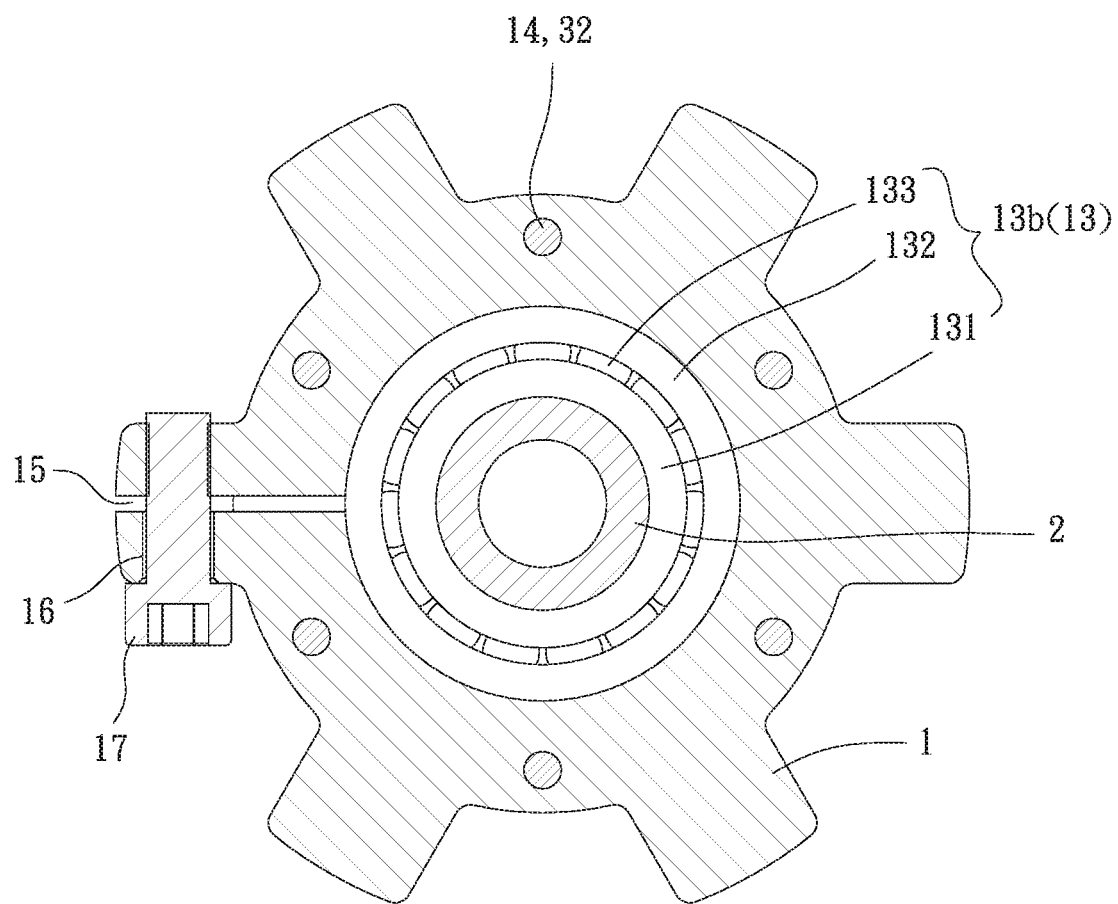
FIG. 4 is a cross sectional view of the bearing assembly for the motor taken along line 4-4 in FIG. 2.
Figure 5:
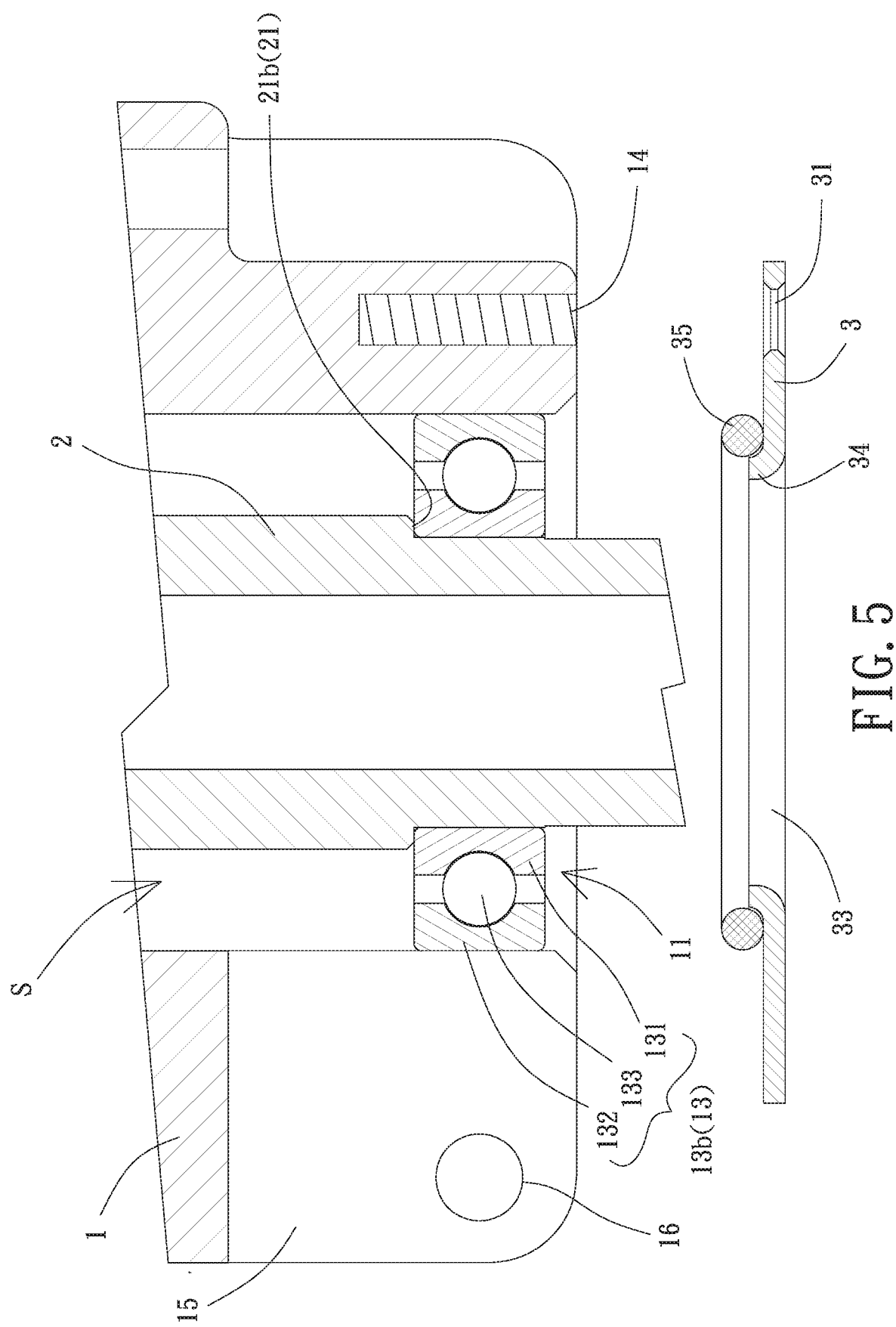
FIG. 5 is a partially enlarged view of FIG. 2 before a cover is assembled.

Referring to FIGS. 2, 4 and 5, the shaft 2 extends through the bearing seat 1 in a manner that the two ends of the shaft 2 extend out of the shaft-coupling hole 11 and the shaft hole 12 of the bearing seat 1, respectively. The inner races 131 of the bearings 13 are securely coupled with the shaft 2, and the outer races 132 of the bearings 13 are securely coupled with an inner periphery of the bearing seat 1 delimiting the chamber S. The cover 3 is fixed to the end of the bearing seat 1 where the shaft-coupling hole 11 is. The inner race 131 of the upper bearing 13a abuts the upper abutment portion 21a of the shaft 2, and the outer race 132 of the upper bearing 13a abuts the bearing seat 1. The inner race 131 of the lower bearing 13b abuts the lower abutment portion 21b of the shaft 2, and the elastic member 35 abuts the outer race 132 of the lower bearing 13b. Therefore, the bearings 13 are coupled with the shaft 2. In addition, by extending the positioning member 17 through the horizontal through-hole 16, the tops of the inner race 131 and the outer race 132 are aligned with each other and the bottoms of the inner race 131 and the outer race 132 are aligned with each other. Thus, the plurality of balls 133 can be firmly coupled with the inner race 131 and the outer race 132.

Figure 6:
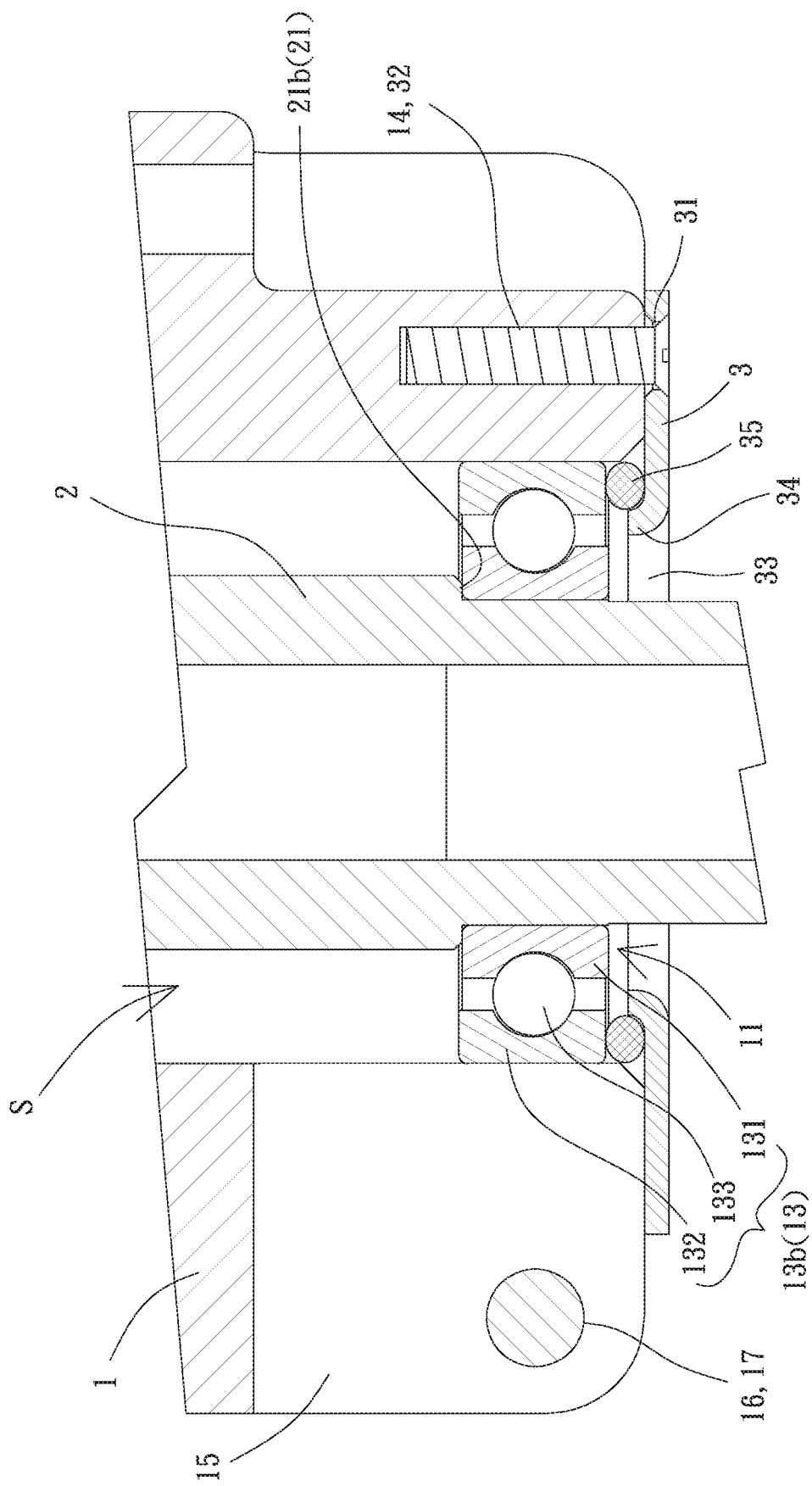
FIG. 6 is a partially enlarged view of FIG. 2 after the cover is assembled.

Referring to FIG. 6, after the motor is used for a long time, gaps are formed between the balls 133 and the inner race 131 and the outer race 132 due to the friction therebetween. In this situation, the positioning member 17 can be loosened.

Since the elastic member 35 surrounds the annular lip 34 and abuts the outer race 132, the pressure that the outer race 132 exerts on the inner race 131 can be adjusted to reduce the distance between the cover 3 and the top of the bearing seat 1. As a result, the outer race 132 is misaligned with the inner race 131, causing misalignment between the tops of the inner race 131 and the outer race 132 and between the bottoms of the inner race 131 and the outer race 132. This enables the plurality of balls 133 to be firmly coupled with the inner race 131 and the outer race 132 again. At this time, the positioning member 17 can be tightened to reduce the slit 15 of the bearing seat 1, such that the bearing seat 1 can properly clamp the bearing 13.

Figure 7:
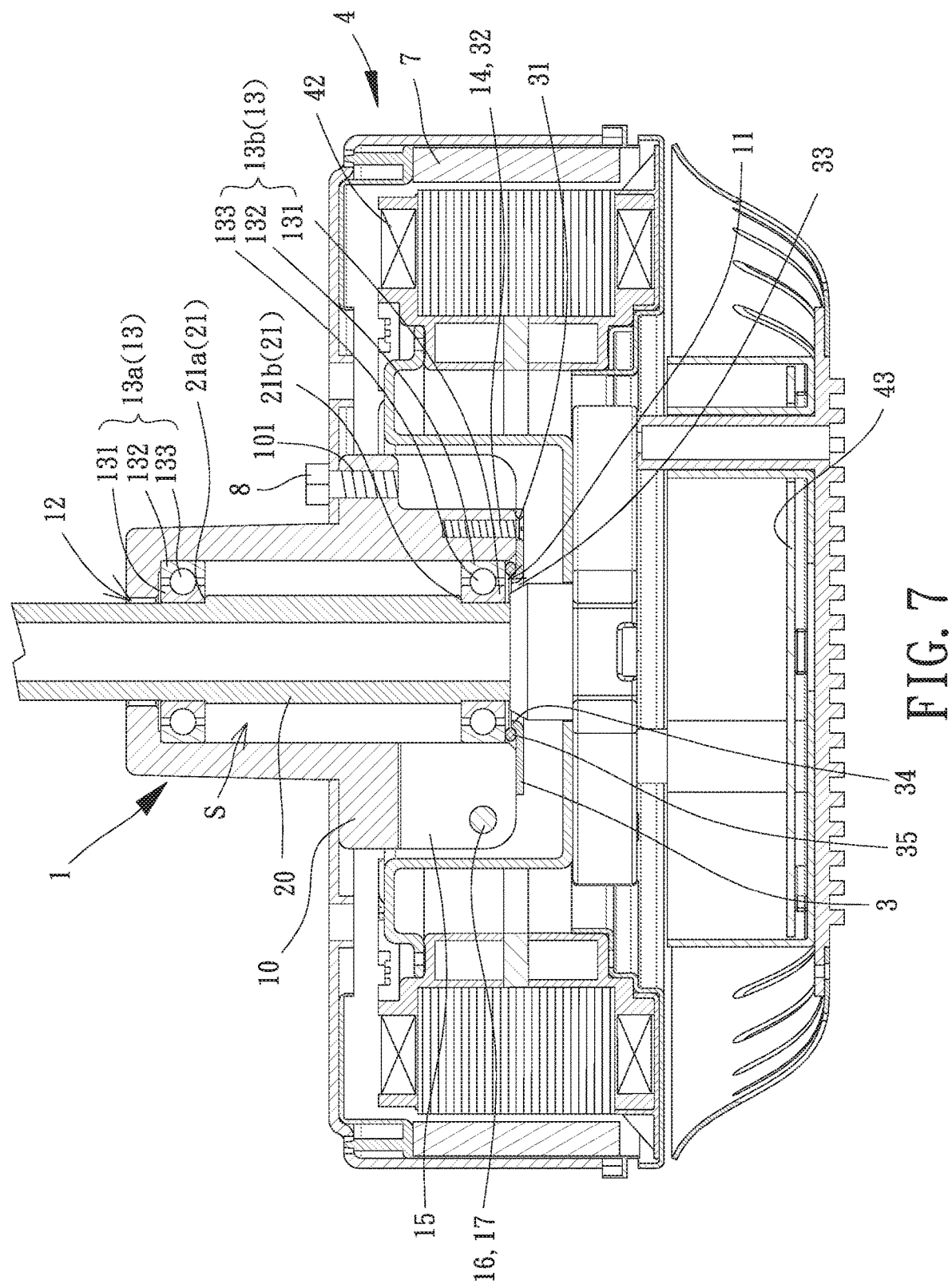
FIG. 7 is a cross sectional view of a motor including the bearing assembly of the first embodiment of the invention.

Referring to FIG. 7, the bearing seat 1 further includes an engagement face 10 having a plurality of positioning holes 101. A fastener 8 extends into a respective positioning hole 101 to couple a housing 4 of a motor with the bearing seat 1. The housing 4 accommodates a stator 42, a circuit board 43, and a permanent magnet 7 mounted to an inner periphery of the housing 4. The housing 4 and the bearing seat 1 can rotate relatively to the stator 42. As the motor is used for a long time where gaps are formed between the balls 133 and the inner race 131 and the outer race 132 due to the friction therebetween, the positioning member 17 can be loosened for the elastic member 35 to adjust the pressure the outer race 132 exerts on the inner race 131. In this regard, the outer race 132 is misaligned with the inner race 131 to permit the balls 133 to firmly connect to the inner race 131 and the outer race 132 again. Then, the positioning member 17 is tightened up to permit the bearing seat 1 to properly clamp the bearing 13. Thus, the housing 4 and the bearing seat 1 can smoothly rotate relatively to the stator 42 to reduce the noise in rotation and to increase the lifespan of the bearings 13.

Figure 8:
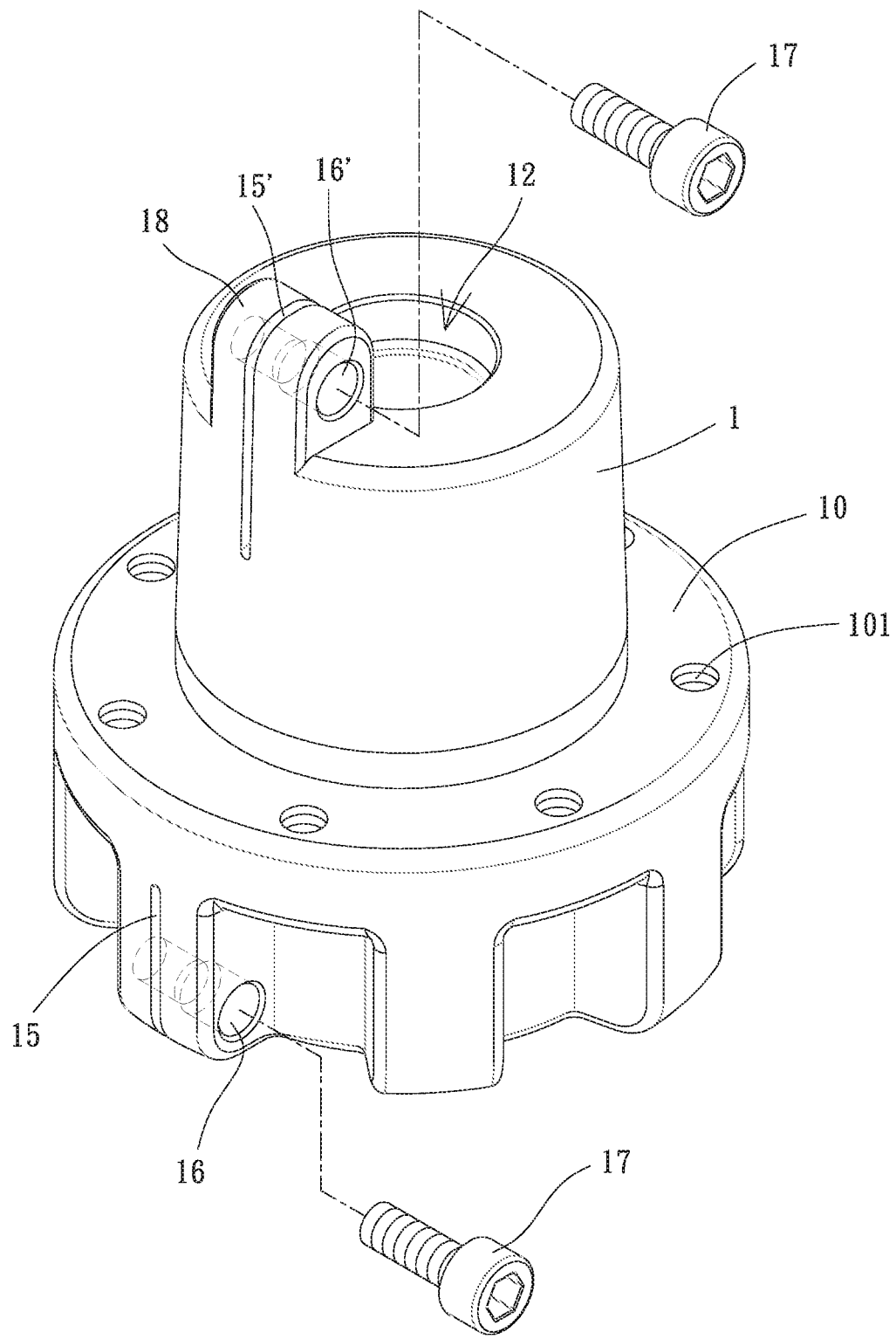
FIG. 8 is a perspective view of a bearing assembly for a motor according to a second embodiment of the invention.

FIG. 8 shows a bearing assembly for a motor according to a second embodiment of the invention. As compared with the first embodiment, the bearing seat 1 in the second embodiment further includes a protrusion 18 protruding from a top of the bearing seat 1 where the shaft hole 12 is. The protrusion 18 also includes a slit 15' which is adjustable. The slit 15' extends through the protrusion 18 and intercommunicates with the shaft hole 12. The protrusion 18 also includes a horizontal through-hole 16' extending through the protrusion 18. A positioning member 17 can extend through the horizontal through-hole 16'. The positioning member 17 may be a screw and a nut. Alternatively, the horizontal through-hole 16' includes inner threads such that the threaded positioning member 17 can be directly screwed through the horizontal through-hole 16' to adjust the slit 15'. In this regard, since the bearing seat 1 includes two slits 15 and 15' and two horizontal through-holes 16 and 16', each positioning member 17 can be operated to adjust a corresponding slit 15 or 15' in a size as required when the motor is used for a long time where gaps are formed between the balls 133 and the inner race 131 and the outer race 132 due to the friction therebetween. This permits the bearing seat 1 to firmly clamp the bearing 13 as shown in FIG. 2.

Figure 9:
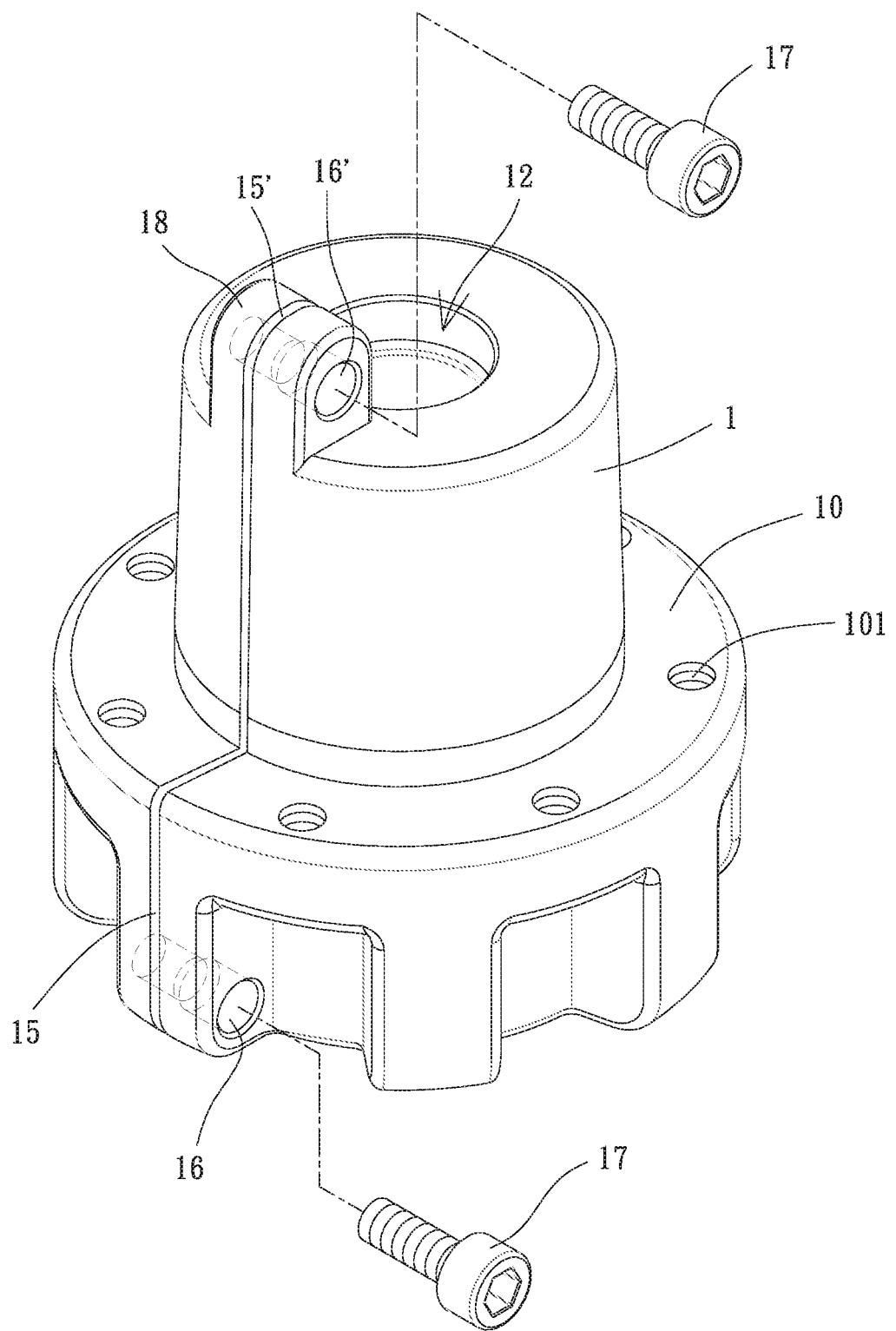
FIG. 9 is a perspective view of a bearing assembly for a motor according to a third embodiment of the invention.

FIG. 9 shows a bearing assembly for a motor according to a third embodiment of the invention. As compared with the second embodiment, the slit 15 in this embodiment intercommunicates with the slit 15' of the protrusion 18. A positioning member 17 can extend through the horizontal through-hole 16, and another positioning member 17 can also extend through the horizontal through-hole 16' of the protrusion 18. In this arrangement, as the motor is used for a long time where gaps are formed between the balls 133 and the inner race 131 and the outer race 132 due to the friction therebetween, each positioning member 17 can be operated to adjust a corresponding slit 15 or 15' in a size as required. Advantageously, the bearing seat 1 is able to clamp the bearing 13 more securely as is shown in FIG. 2.

Figure 10:
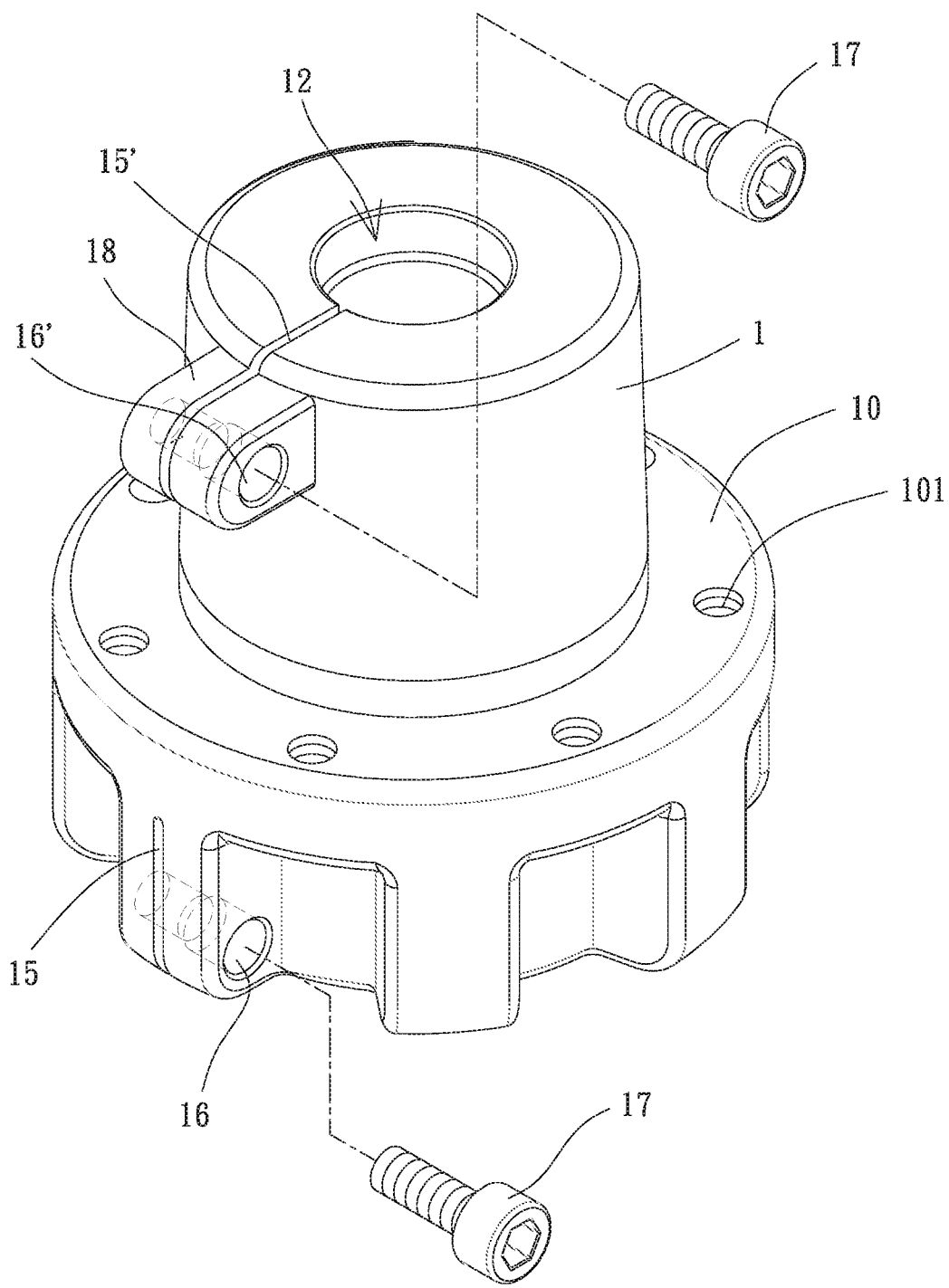
FIG. 10 is a perspective view of a bearing assembly for a motor according to a fourth embodiment of the invention.

FIG. 10 shows a bearing assembly for a motor according to a fourth embodiment of the invention. As compared with the second embodiment, the bearing seat 1 in the fourth embodiment further includes a protrusion 18 protruding from an outer periphery of the bearing seat 1 at an end of the shaft hole 12. The protrusion 18 also includes a slit 15' which is adjustable. The slit 15' extends through the protrusion 18 and intercommunicates with the shaft hole 12. The protrusion 18 includes a horizontal through-hole 16' extending through the protrusion 18. A positioning member 17 can extend through the horizontal through-hole 16'. The positioning member 17 may be a screw and a nut. Alternatively, the horizontal through-hole 16' includes inner threads such that the threaded positioning member 17 can be directly screwed through the horizontal through-hole 16' to adjust the slit 15' in a size as required. In this regard, since the bearing seat 1 includes two slits 15 and 15' and two horizontal through-holes 16 and 16', each positioning member 17 can be operated to adjust a corresponding slit 15 or 15' in a size as required when the motor is used for a long time where gaps are formed between the balls 133 and the inner race 131 and the outer race 132 due to the friction therebetween. This permits the bearing seat 1 to firmly clamp the bearing 13 as shown in FIG. 2.

Figure 11:
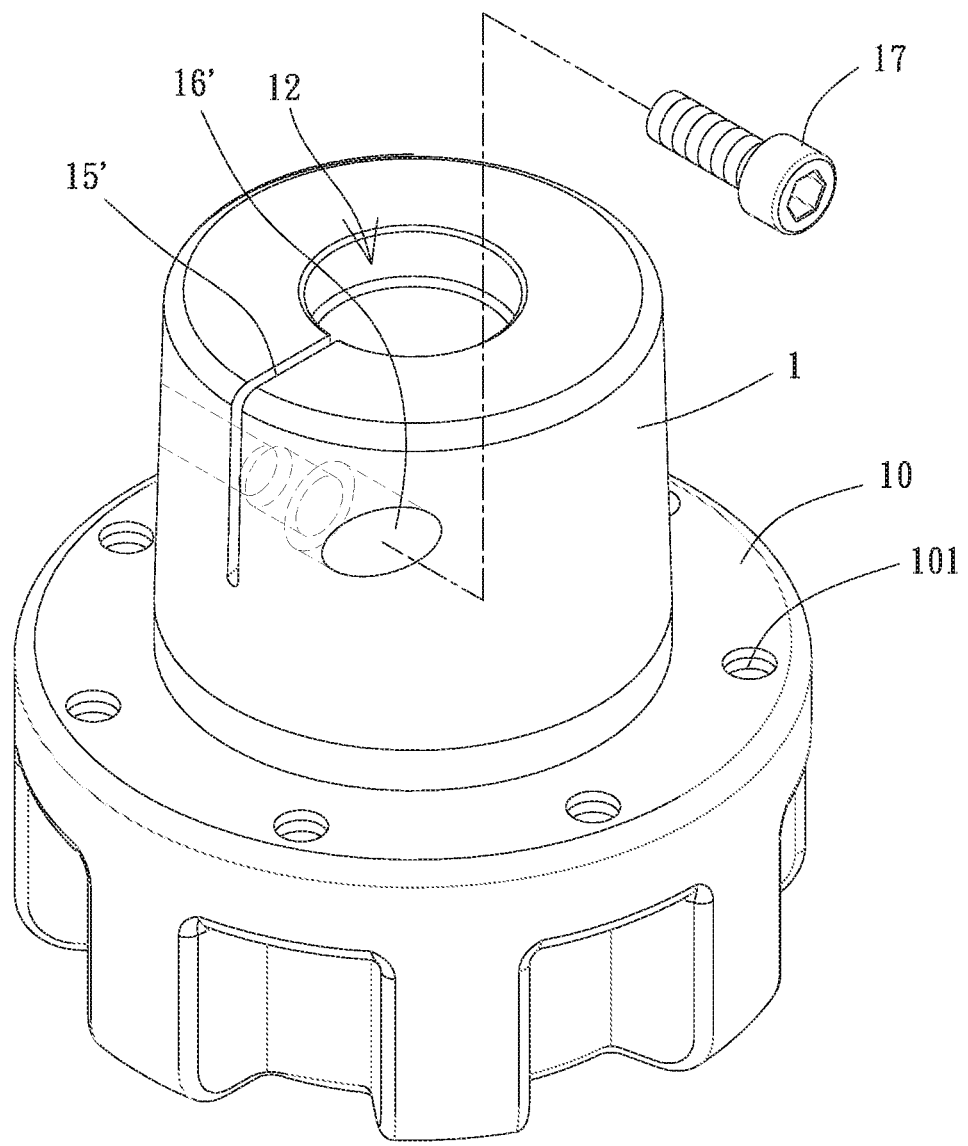
FIG. 11 is a perspective view of a bearing assembly for a motor according to a fifth embodiment of the invention.

FIG. 11 shows a bearing assembly for a motor according to a fifth embodiment of the invention. As compared with the fourth embodiment, the slit 15' is formed on an end of the bearing seat 1 where the shaft hole 12 is. The slit 15' extends through the bearing seat 1 from the inner periphery to the outer periphery thereof and intercommunicates with the shaft hole 12. The horizontal through-hole 16' extends through the slit 15'. A positioning member 17 can extend through the horizontal through-hole 16'. The positioning member 17 may be a screw and a nut. Alternatively, the horizontal through-hole 16' includes inner threads such that the threaded positioning member 17 can be directly screwed through the horizontal through-hole 16' to adjust the slit 15' in a size as required. In this regard, each positioning member 17 can be operated to adjust the slit 15 in a size as required when the motor is used for a long time where gaps are formed between the balls 133 and the inner race 131 and the outer race 132 due to the friction therebetween. This permits the bearing seat 1 to firmly clamp the bearing 13 as shown in FIG. 2.

Figure 12:
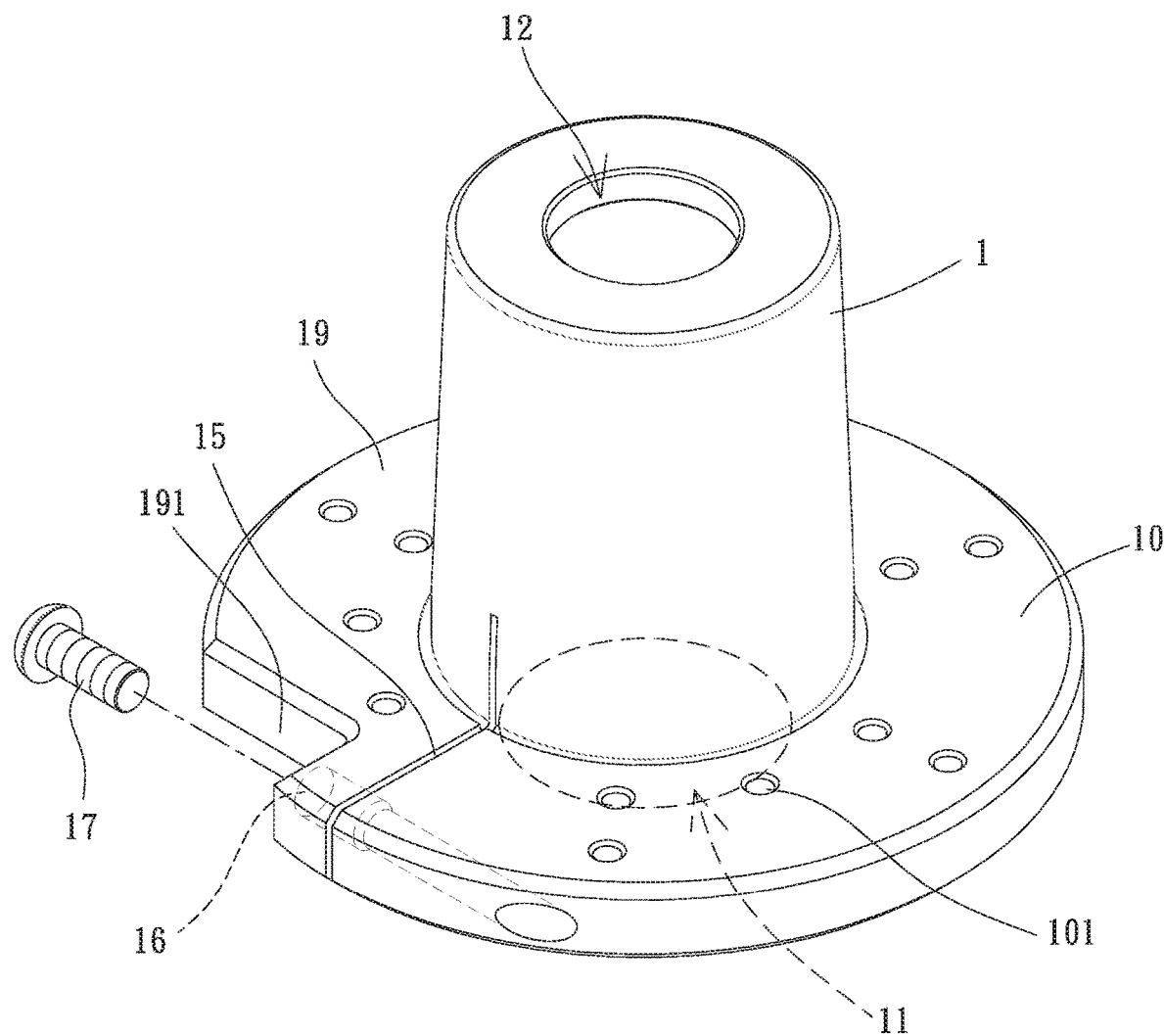
FIG. 12 is a perspective view of a bearing assembly for a motor according to a sixth embodiment of the invention.

FIG. 12 shows a bearing assembly for a motor according to a sixth embodiment of the invention. As compared with the fifth embodiment, the bearing seat 1 includes a disc 19 at an end of the bearing seat 1 where the shaft-coupling hole 11 is. The slit 15 extends through the disc 19 and towards another end of the bearing seat 1 where the shaft hole 12 is. The horizontal through-hole 16 extends through the slit 15. The disc 19 includes a cutoff portion 191 intercommunicating with the horizontal through-hole 16 to permit the positioning member 17 to extend into the horizontal through-hole 16. In this arrangement, the slit 15 can be adjusted in a size as required for the bearing seat 1 to firmly clamp the bearing 13 as is shown in FIG. 2.

Figure 13:
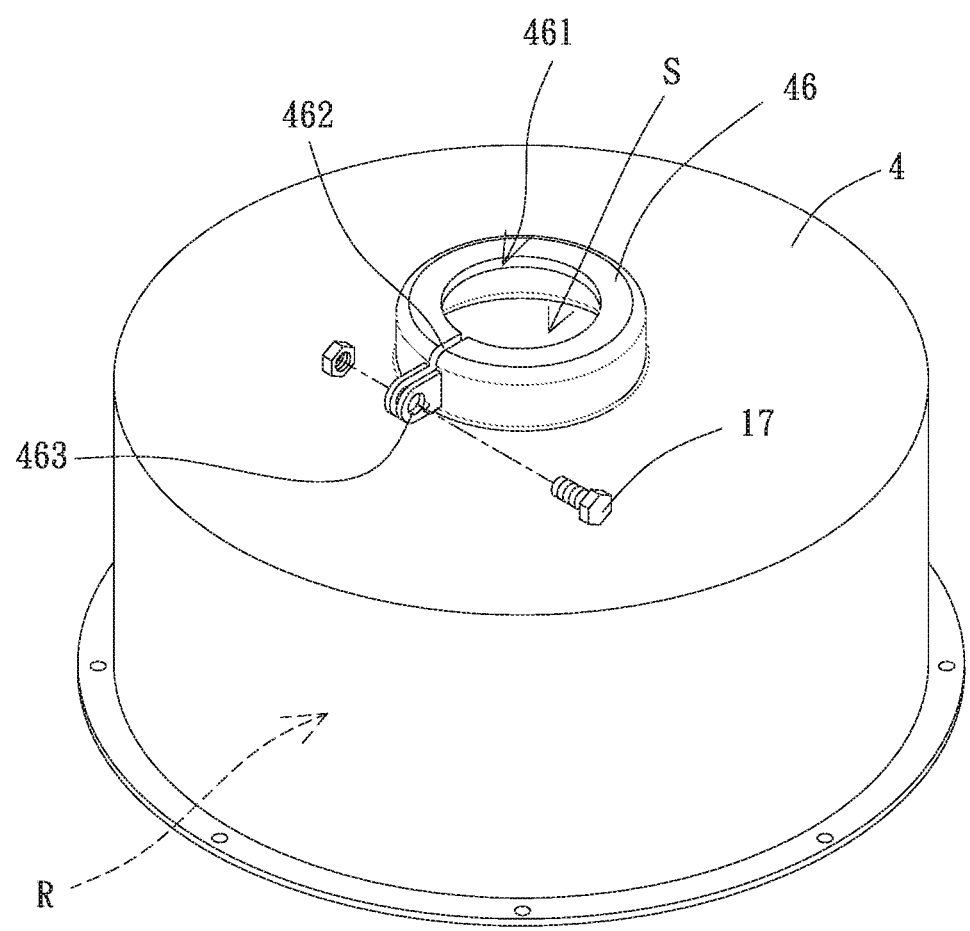
FIG. 13 is a perspective view of a bearing assembly for a motor according to a seventh embodiment of the invention.
Figure 14:
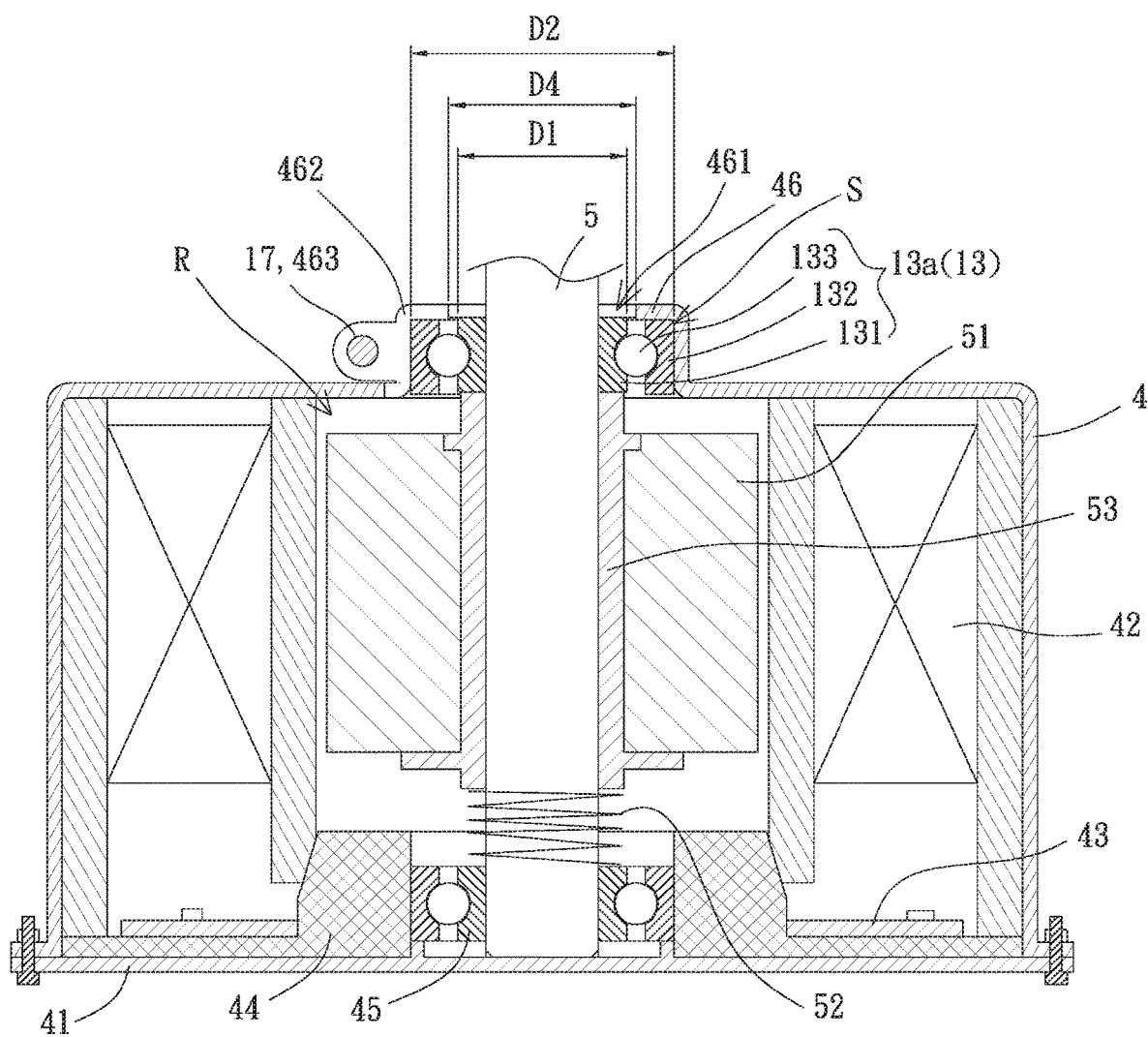
FIG. 14 is a cross sectional view of an assembled motor including a bearing assembly according to an eighth embodiment of the invention.

FIGS. 13 and 14 show a motor including the bearing assembly according to an embodiment of the invention. The motor includes a housing 4 having a compartment R. The compartment R has an opening coupled with a bottom plate 41. The bottom plate 41 is located at an end of the housing 4. The housing 4 includes a stator 42 and a circuit board 43.

The bottom plate 41 includes a seat 44 that can support a shaft 5 that rotates. A support 45 is preferably disposed between the shaft 5 and the seat 44. The support 45 may be a conventional self-lubricating bearing, an oil bearing, a ball bearing or the like that provides the shaft 5 with stable rotation. The support 45 is a ball bearing in this embodiment. The housing 4 further includes a bearing seat 46 having a shaft hole 461. The shaft hole 461 has a diameter D4. An end of the shaft 5 extends through the shaft hole 461. A bearing 13 is received in the bearing seat 46 and includes an inner race 131, an outer race 132 and a plurality of balls 133. The inner race 131 has an outer diameter D1 and the outer race 132 has an outer diameter D2. The diameter D4 of the shaft hole 461 is larger than the outer diameter D1 of the inner race 131 but is smaller than the outer diameter D2 of the outer race 132, permitting the top of the bearing seat 46 to abut the outer race 132. The bearing seat 46 includes a slit 462 and a horizontal through-hole 463. The slit 462 is adjustable. A positioning member 17 can extend through the horizontal through-hole 463 to adjust the slit 462 in a size as required.

Referring to FIGS. 13 and 14, the shaft 5 has an end that abuts the support 45 and rotates thereupon. The shaft 5 is coupled with a rotor 51 and an elastic element 52. The rotor 51 rotates relatively to the stator 42. A positioning ring 53 is preferably disposed between the rotor 51 and the shaft 5, such that the rotor 51 can be coupled with the shaft 5. The elastic element 52 has an end connected to the support 45, as well as another end connected to an end of the positioning ring 53. Another end of the positioning ring 53 is connected to the other inner race 131 of the other bearing 13. The elastic element 52 can apply pressure to the inner race 131, thereby securely coupling the plurality of balls 133 with the inner race 131 and the outer race 132.

Referring to FIGS. 13 and 14 again, as the motor is used for a long time where gaps are formed between the balls 133 and the inner race 131 and the outer race 132 due to the friction therebetween, the positioning member 17 can be loosened. Due to the arrangement of the elastic element 52, the elastic element 52 pushes the positioning ring 53 and the shaft 5 upwards in an axial direction by applying pressure thereto. Accordingly, the inner race 131 moves relatively to the outer race 132. This permits the plurality of balls 133 to securely couple with the inner race 131 and the outer race 132 again. In this regard, the positioning member 17 can be tightened up to reduce the slit 15 of the bearing seat 46, permitting the bearing seat 46 to firmly clamp the bearing 13. In this arrangement, the shaft 5 can smoothly rotate relatively to the bearing seat 46 again, thus reducing the noise during the operation and increasing the lifespan of the bearing 13.

Figure 15:
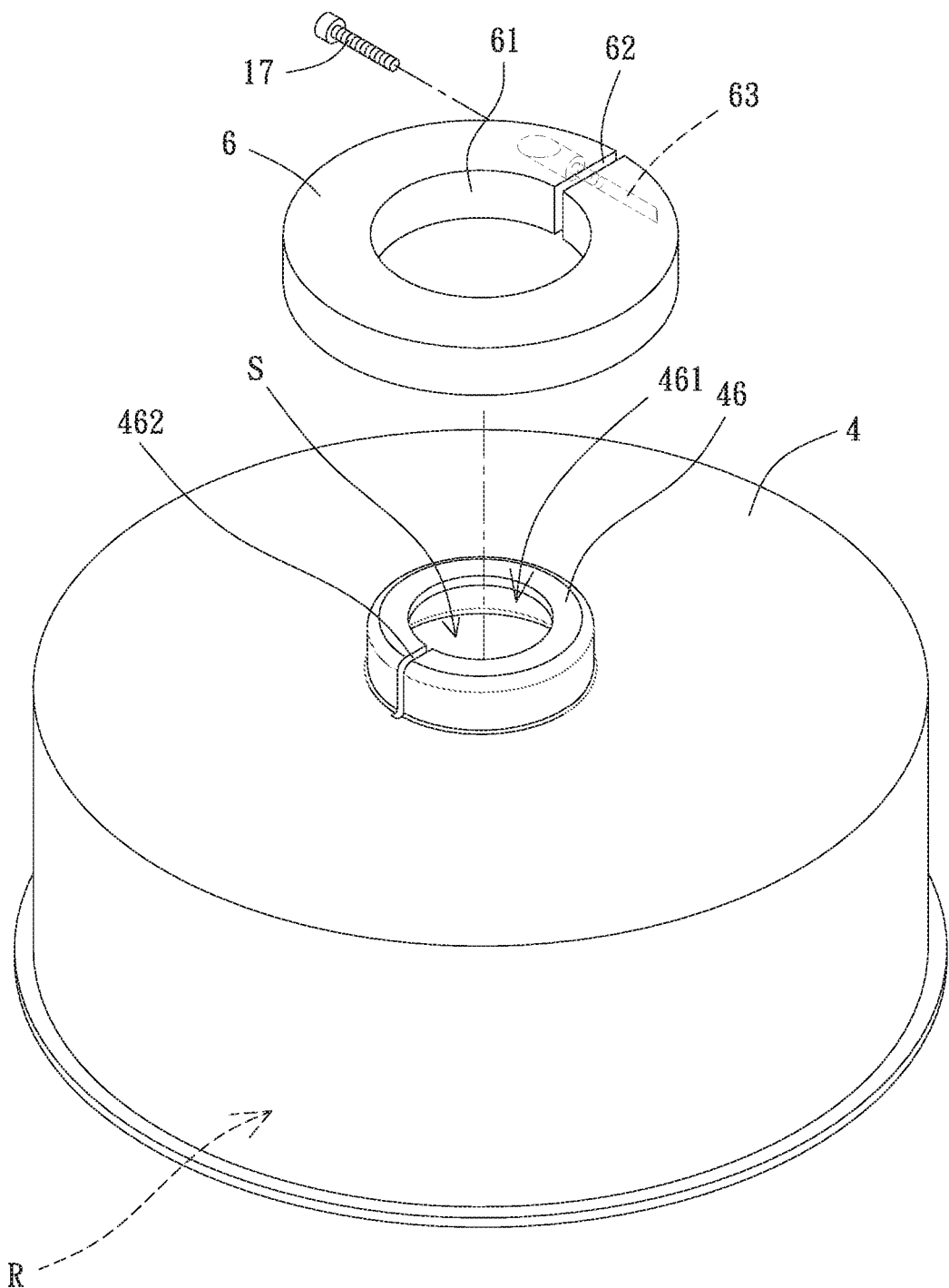
FIG. 15 is perspective view of a bearing assembly for a motor according to a ninth embodiment of the invention.

FIGS. 14 and 15 show a motor including the bearing assembly according to another embodiment of the invention. In this embodiment, the slit 462 can be adjusted by a positioning ring 6. The positioning ring 6 includes a hole 61, a slit 62 and a horizontal through-hole 63. The positioning ring 6 is fit around the bearing seat 46. The slit 62 extends through the positioning ring 6 from an inner periphery delimiting the hole 61 to an outer periphery thereof. The horizontal through-hole 63 extends through the slit 62. A positioning member 17 can extend through the horizontal through-hole 63 to adjust the slit 62 in a size as required. Therefore, via the use of the positioning ring 6, the bearing 13 can be firmly clamped by the bearing seat 46. This makes the shaft 5 rotate relatively to the bearing seat 46 more smoothly, reducing the noise in rotation and increasing the lifespan of the bearing 13.

In summary, via the arrangement of the slit, the bearing assembly according to the invention can misalign the inner race with the outer race by applying pressure to the inner race or the outer race when gaps are formed between the balls and the inner race and the outer race due to the friction therebetween. In this regard, a positioning member can be tightened up to adjust the slit in a size as required, such that the balls can be securely coupled with the inner race and the outer race. Therefore, the motor including the bearing assembly can achieve the advantages of reducing the noise in rotation and increasing the lifespan of the bearings.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A bearing assembly comprising:
   a bearing seat including a chamber, a shaft-coupling hole and a shaft hole, wherein the shaft-coupling hole and the shaft hole intercommunicate with the chamber, and wherein the bearing seat has a slit which is adjustable;
   at least one bearing received in the chamber;
   a shaft extending through the shaft hole and the at least one bearing and including at least one abutment portion, and wherein the at least one bearing abuts the at least one abutment portion; and
   a cover coupled with the bearing seat,
   wherein the at least one bearing includes an upper bearing relatively distant to the cover and a lower bearing relatively adjacent to the cover, wherein each of the upper and lower bearings includes an inner race and an outer race, and wherein an elastic member is disposed between the cover and the outer race of the lower bearing,
   wherein the shaft includes an expansion portion, wherein the expansion portion has an end forming an upper abutment portion and another end forming a lower abutment portion, wherein the inner race of the upper bearing abuts the upper abutment portion, wherein the outer race of the upper bearing abuts an inner periphery of the bearing seat delimiting the chamber, wherein the inner race of the lower bearing abuts the lower abutment portion, and wherein the outer race of the lower bearing abuts the elastic member.

2. The bearing assembly as claimed in claim 1, wherein the outer race includes an outer wall fitted with a rubber ring.

3. The bearing assembly as claimed in claim 1, wherein the cover includes a central hole, wherein an annular lip is provided at an edge of the central hole and protrudes from a face of the cover facing the bearing seat.

4. The bearing assembly as claimed in claim 3, wherein the inner race has an outer diameter and the outer race has an outer diameter, wherein the annular lip includes a diameter larger than the outer diameter of the inner race and smaller than the outer diameter of the outer race.

5. The bearing assembly as claimed in claim 1, wherein the bearing seat includes a plurality of engaging holes on one end face of the bearing seat where the shaft-coupling hole is, wherein the cover has a plurality of through-holes, and wherein a plurality of fasteners respectively extends through the plurality of through-holes and is threadedly engaged with the plurality of engaging holes of the bearing seat, respectively.

6. The bearing assembly as claimed in claim 1, wherein the bearing seat has a horizontal through-hole extending through the slit, and wherein a positioning member extends through the horizontal through-hole to adjust the slit.

7. The bearing assembly as claimed in claim 1, wherein the slit is formed on an end of the bearing seat where the shaft-coupling hole is, and wherein the slit is radially aligned with one of the at least one bearing.

8. The bearing assembly as claimed in claim 6, wherein the horizontal through-hole is radially aligned with one of the at least one bearing.

9. The bearing assembly as claimed in claim 1, wherein the slit extends through the bearing seat from an inner periphery to an outer periphery of the bearing seat and intercommunicates with the chamber.

10. The bearing assembly as claimed in claim 6, wherein the positioning member includes a screw and a nut.

11. The bearing assembly as claimed in claim 6, wherein the horizontal through-hole is provided with inner threads, and wherein the positioning member is provided with outer threads and is threaded through the inner threads of the horizontal through-hole.

12. The bearing assembly as claimed in claim 1, wherein the elastic member is a rubber ring, a spring or a spring washer.

13. The bearing assembly as claimed in claim 3, wherein the elastic member surrounds the annular lip and abuts the outer race.

14. The bearing assembly as claimed in claim 1, wherein the bearing seat further includes a protrusion protruding from a top of the bearing seat where the shaft hole is, wherein the protrusion includes a slit extending through the protrusion and intercommunicating with the shaft hole, wherein the protrusion includes a horizontal through-hole extending through the protrusion, and wherein a positioning member extends through the horizontal through-hole of the protrusion to adjust the slit.

15. The bearing assembly as claimed in claim 14, wherein the positioning member is a screw and a nut.

16. The bearing assembly as claimed in claim 14, wherein the horizontal through-hole of the protrusion is provided with inner threads, and wherein the positioning member is provided with outer threads and is threaded through the inner threads of the horizontal through-hole.

17. The bearing assembly as claimed in claim 14, wherein the slit of the protrusion intercommunicates with the slit of the bearing seat.

18. The bearing assembly as claimed in claim 1, wherein the slit is formed on an end of the bearing seat where the shaft hole is and intercommunicates with the shaft hole.

19. The bearing assembly as claimed in claim 5, wherein the bearing seat includes a disc at an end of the bearing seat where the shaft-coupling hole is, wherein the slit extends through the disc and towards another end of the bearing seat where the shaft hole is, and wherein the disc includes a cutoff portion intercommunicating with the horizontal through-hole.

20. A motor including the bearing assembly as claimed in claim 1.

* * * * *